United States Patent [19]

Sagi et al.

[11] B 3,925,242

[45] Dec. 9, 1975

[54] PROCESS FOR REDUCING FOAMING OF LIQUIDS SUSCEPTIBLE TO FOAMING

[75] Inventors: Ferenc Sagi, Bron; Michel Roussos, Lyon, both of France

[73] Assignee: Rhone-Poulenc S.A., Paris, France

[22] Filed: June 18, 1973

[21] Appl. No.: 370,706

[44] Published under the Trial Voluntary Protest Program on January 28, 1975 as document no. B 370,706.

Related U.S. Application Data

[62] Division of Ser. No. 153,829, June 16, 1971, abandoned.

[30] Foreign Application Priority Data

June 17, 1970 France .......................... 70.22284

[52] U.S. Cl. ................ 252/321; 252/312; 252/356; 252/358; 252/DIG. 1; 426/329; 428/321
[51] Int. Cl.² ........................................ B01D 19/04
[58] Field of Search .......... 252/321, 312; 260/234 R

[56] References Cited
UNITED STATES PATENTS

| | | | |
|---|---|---|---|
| 2,114,490 | 4/1938 | Harris | 252/311 X |
| 2,829,112 | 4/1958 | Solomon | 252/358 |
| 3,054,789 | 9/1962 | D'Amato | 260/234 R |
| 3,076,768 | 2/1963 | Boylan | 252/321 X |

*Primary Examiner*—Richard D. Lovering
*Attorney, Agent, or Firm*—Stevens, Davis, Miller & Mosher

[57] ABSTRACT

An aqueous emulsion of a silicone is prepared using, as emulsifier, a sucroglyceride e.g. a transesterification product of sucrose and a triglyceride. The resulting emulsions are stable, even under basic conditions, and have better anti-foaming properties and provide more satisfactory non-stick surfaces than emulsions using conventional emulsifiers.

3 Claims, No Drawings

PROCESS FOR REDUCING FOAMING OF LIQUIDS SUSCEPTIBLE TO FOAMING

This application is a divisional application from application Ser. No. 153,829 filed June 16, 1971 and now abandoned.

The present invention relates to aqueous emulsions of silicones and to their applications.

The silicone industry has for a long time been familiar with the use of silicon derivatives in the form of aqueous emulsions in various applications which utilise especially their non-stick, anti-foaming and water-repellent properties.

The emulsification of silicon derivatives is frequently difficult because of the peculiar nature of silicones and the fact that the efficacy of the emulsions when obtained is, in a basic medium, frequently low or even non-existant.

Problems have also arisen in the production of emulsions suitable for use with foodstuffs, e.g., suitable for use in jam, dairy produce or in siliconised carriers which are to be brought into contact with foodstuffs.

Aqueous silicone emulsions have been prepared using emulsifiers suitable for use with foodstuffs, for example, glycereol monostearates, but emulsifiers used so far do not make it possible to obtain aqueous emulsions of silicones which show good storage stability, ease of dilution, efficacy in use, and, above all, efficacy in a basic medium. The present invention provides aqueous emulsions of silicones which possess these properties.

The present invention provides an emulsion comprising an aqueous phase, a silicone phase and, as emulsifier, at least one sucroglyceride.

The sucroglycerides, which are compounds suitable for use with foods, are complexes of monoester and diesters of sucrose and of monoglycerides and diglycerides obtained by trans-esterification of a natural triglyceride such as, for example, palm oil, lard, suet or copra, with sucrose. Amongst the sucroglycerides which can be employed in the invention, are those known industrially under the name of "Celynols."

The aqueous emulsion of silicones prefereably contains, 2 to 50 parts by weight, and more particularly, 10 to 25 parts by weight of sucroglyceride per 100 parts by weight of silicones.

Silicones which can be used in the emulsions of the invention, include the diorganopolysiloxanes and especially the liquid silicones, e.g., dimethylpolysiloxanes, the organohydrogenopolysiloxanes, e.g. methylhydrogenopolysiloxanes and the anti-foaming silicones consisting of liquid silicones containing from 1 to 10% by weight of finely dispersed silicas.

The emulsion may be prepared by hot mixing of the various constituents by any appropriate mechanical means, for example with the aid of a container equipped with a vigorous stirring device, capable of mixing liquids or compositions of which the viscosity can be as much as 150,000 to 200,000 cSt, and by means of a colloid mill.

The emulsions of the invention can be used for the preparation of non-stick and water-repellent coatings, on a substrate by coating the substrate with the emulsion. The emulsions may also be incorporated as anti-foaming agents in liquids which are susceptible to foaming to reduce the tendancy to foam.

The following Examples are given to illustrate the invention.

EXAMPLE 1

Preparation of an Anti-Foaming Emulsion A 10 g of a sucroglyceride known industrially by the name of "Celynol MST 11," obtained by trans-esterification of suet with sucrose, and having the characteristics given below, are melted on a water bath:

Melting point: 53°C.
Viscosity at 98°–99°C: 210 cSt
Density at 65°C: 0.963
Acid number: 5.5
Saponification number: 162

After the "Celynol MST 11" has completely melted, 10 $cm^3$ of water at 60°C are added, whilst stirring constantly. When the mixture is homogeneous, 46.2 g of an anti-foaming composition, previously heated to 70°C, and containing, by weight 97% of a dimethylpolysiloxane oil of 1,000 cSt viscosity at 25°C. and 3% of a pyrogenic silica known industrially by the name of "Aerosil," are added with vigorous stirring. When homogeneity has been achieved, 30 $cm^3$ of water at 20°C. are added, with constant stirring.

The resulting mixture is subjected to a first grinding in a colloid mill, followed by a second grinding after adding 60 $cm^3$ of water. A thick aqueous emulsion is obtained, wherein the concentration by weight of active silicone material is of the order of 30%; the emulsion is stable on storage, contains particles of the order of 5 to 10 microns, and is easy to dilute to use at concentrations of 1 to 2%.

EXAMPLE 2

Preparation of an Anti-Foaming Emulsion B.

30 kg of the anti-foaming composition employed in Example 1 are heated to a temperature of about 70°C in a clean 100 litre container equipped with a stirring system. 3.6 kg of glycerol monostearate, known industrially by the name of "Aldo 33," are then added, whilst stirring. Once this mixture has become homogeneous, a homogeneous mixture prepared beforehand, as in Example 1, from 1.8 kg of "Celynol MST 11" and 5 kg of water is added, with constant stirring. Thereafter, 13 kg of lukewarm water are added.

The resulting mixture is subjected to a first grinding in a colloid mill, followed by a second grinding after adding 46.6 kg of water. A thick aqueous emulsion is obtained, wherein the concentration by weight of active silicone material is of the order of 30%; the emulsion is stable on storage, contains particles of the order of 5 to 10 microns, and is easy to dilute to use at concentrations of 1 to 2%.

COMPARATIVE EXAMPLE C

Preparation of an Anti-Foaming Emulsion C.

The emulsion is prepared as described in Example 2, but using only Aldo 33 as emulsifier, 4 kg of Aldo 33 are used, An aqueous emulsion is obtained which is stable in storage and easy to dilute.

The emulsions A, B and C obtained respectively in Examples 1, 2 and the comparative Example C, are then compared for anti-foaming efficacy, using the following test:

A 1% by weight aqueous solution of a strongly foaming agent, an octylphenol-polyoxyethylene condensate known industrially by the name of "Triton X 100," is prepared. A 250 cm³ glass bottle containing 100 cm³ of this foaming solution is violently agitated for 10 seconds on a shaker. A specific amount of anti-foaming emulsion, corresponding, for example, to 50 or 100 parts per million of active silicone material, by weight relative to the foaming solution, is then added. The mixture is again agitated for 10 seconds and the time which elapses until the foam completely disappears is noted. The agitation process is repeated until the time of disappearance of the foam is of the order of one minute. The anti-foaming quality of the emulsion is recorded as the number of such agitation processes carried out. The same experiment is repeated, varying the amount of emulsion added and the pH of the foaming solution.

The results obtained are shown in Table 1 below.

Table 1

| pH of the foaming solution | Amount of active silicon material in ppm | Number of Agitation Processes | | |
|---|---|---|---|---|
| | | Emulsion A | Emulsion B | Emulsion C |
| 7 | 50 | 16 | 15 | 3 |
| 10 | 50 | 12 | 11 | 4 |
| | 100 | 33 | 30 | 10 |
| 12 | 50 | 7 | 7 | 2 |
| | 100 | 21 | 20 | 10 |

The results clearly show the higher anti-foaming efficacy of the emulsions A and B according to the invention when compared to emulsion C, especially in a basic medium.

The anti-foaming efficacy of emulsions A, B and C is also compared in industrial tests described below, in a basic or non-basic medium, which may or may not be a foodstuff medium. The amounts of emulsion used are expressed in ppm of active silicone material.

a. In a dairy producing yoghourt, the milk containing rennet is pumped into packaging pots at 80°C. The tendency to foam, which is undesirable in itself, results in a poor presentation of the product (granular surface) which favours ageing. The addition of 10 ppm of emulsion A or of emulsion B deals with this shortcoming and gives a packaged product of smooth and glossy surfacae appearance. It requires 30 ppm of emulsion C to achieve an eequivalent result.

b. Foams frequently occur at the outlet of the extractors in the preparation of coffee extracts, and these foams are objectionable and can lead of losses. The addition of 20 ppm of emulsion A or of emulsion B prevents the formation of foams. It requires 50 ppm of emulsion C to obtain an equivalent result.

c. On incorporating 2 or 3 ppm of emulsion A or of emulsion B in the preparation of milk granules intended for feeding calves, the formation of objectionable foams during redispersion in water is prevented. It requires 15 ppm of emulsion C to achieve an equivalent result.

d. In the production of concentrated aqueous solutions of vitamins intended for the pharmaceutical industry, especially vitamin P, which is flavonoid in nature, 2 or 3 ppm of emulsion A or emulsion B prevent the formation of foams during the concentration. It requires 15 ppm of emulsion C to obtain an equivalent result.

e. In the concentration of orange juice to produce vitamins and flavouring substances, the addition of 1 to 5 ppm of emulsion A or of emulsion B prevents the formation of foams at the time that the concentrators are used. It requires 20 ppm of emulsion C to obtain an equivalent result.

f. The back of carpets is frequently coated with a latex of the butadiene-styrene rubber type or an acrylic latex. Before coating with a doctor blade, these latices are first thickened, whilst stirring, by adding ammonia up to a minimum pH value of 9. This thickening process produces foams which cause non-uniformities in coating. The addition of 5 to 10 ppm of the emulsion A or of the emulsion B prevents the formation of foams and eliminates this defect. It requires 40 ppm of emulsion C to achieve an equivalent result.

g. The manufacture of detergents for washing machines presents the following two problems: the formation of foam during the preparation of the powders and the control of the foam during their use. Depending on the amount of foam which is acceptable in use, it is necessary to employ a greater or lesser amount of anti-foaming emulsion. It is found that 2 to 3 ppm of the emulsion A or of the emulsion B give a result equivalent to that obtained with 10 to 15 ppm of the emulsion C.

EXAMPLE 3

Preparation of an Emulsion D

A composition based on silicone, containing:

a. 252 g of a dimethylpolysiloxane of viscosity 2,000 cPo at 25°C, of which about 50% by weight of the chain ends are OH groups and 50% by weight are $OCH_3$ groups, b. 9.2 g of a methylhydrogenopolysiloxane containing 36.5% by weight of SiH groups, c. 34 g of a dimethylpolysiloxane of viscosity 30 cPo at 25°C, of which the chain ends are OH groups, d. 80 g of a mixture of equal parts by weight of toluene and of perchloroethylene, is mixed, whilst stirring with (e) 180 g of an aqueous solution containing:

$e^1$. 50 g of a polyvinyl alcohol of which the viscosity of a 4% strength aqueous solution is 14 centipoises at 20°C., and of which the average ester number is 135, $e^2$. 11.4 g of "Celynol MST 11,"

$e^3$. 535 g of water and $e^4$. 0.1 g of sorbic acid.

When the mixture has become homogeneous, it is ground 4 times in succession in a colloid mill with the addition of 50 g, 50 g and 60 g of water after the first, second and third grinding respectively.

An aqueous emulsion containing 42% by weight of active silicone material is obtained, wherein the particle size is of the order of 1 micron.

COMPARATIVE EXAMPLE E

Preparation of an Emulsion E.

The emulsion is prepared in the manner described in Example 3, but the "Celynol MST 11" is replaced by an equal weight of the polyvinyl alcohol used in Example 3.

An aqueous emulsion containing 42% by weight of active silicone material is obtained, wherein the particle size is of the order of several microns.

The emulsions D and E obtained respectively in Example 3 and comparative Example E are then compared as regards their efficacy in the treatment of paper, to render it "non-stick."

For this purpose, an emulsion, containing catalyst, of the following composition in parts by weight is prepared:

| | |
|---|---|
| Zinc octoate | 18.2 |
| Toluene | 15 |
| Dibutyl tin-diacetate | 4 |
| Polyvinyl alcohol used in Example 4 | 1.875 |
| Sodium lauryl-sulphate | 0.125 |
| Water | 60.8 |

Each of emulsions D and E is now mixed with the emulsion containing catalyst, at the rate of 12.5 parts by weight of the silicone emulsion, 2.5 parts by weight of the emulsion containing catalyst and 85 parts by weight of water. The resulting emulsions containing catalyst are applied by means of a glass rod to paper which has been treated with sulphuric acid, and the paper is thereafter treated for 2 minutes in an oven at 120°C, which causes the silicone material to cure. The treatment of the paper is carried out firstly with freshly prepared emulsions containing catalyst, and secondary with the emulsions containing catalyst which have aged for 6 hours.

The papers treated in this way are tested for adhesion in the following manner:

An adhesive strip of the "sparadrap" type is applied to the paper and the force required to remove the strip by traction at an angle of 180° is measured. The adhesion is defined by the value of the force found in g/cm.

The removed strip is thereafter applied to a steel sheet and the force required to remove the strip at an angle of 180° is measured. The value of the force found, in g/cm defines the subsequent adhesion.

Finally, an adhesive strip which has not been in any contact with the paper is applied to a steel sheet and the force required to remove the strip by traction at an angle of 180° is measured. The value of the force found, in g/cm, defines the comparison adhesion. The quality of the silicone treatment of the paper is the better the lower is the adhesion, and the closer is the subsequent adhesion to the comparison adhesion.

The results obtained are shown in Table 2 below:

TABLE 2

| | Freshly prepared emulsion containing catalyst | | | Emulsion containing catalyst which has aged for 6 hours | | |
|---|---|---|---|---|---|---|
| | Comparison adhesion | Adhesion | Subsequent adhesion | Comparison adhesion | Adhesion | Subsequent adhesion |
| Emulsion D | 170 | 4 | 172 | 165 | 5 | 163 |
| Emulsion E | 168 | 15 | 140 | 165 | 16 | 130 |

The values given in Table 2 are the average of the results of 12 tests.

It appears clearly that in the case of the emulsion D according to the invention:

i. the value of the adhesion is lower than that obtained with emulsion E and ii. the subsequent adhesion is close to the comparison adhesion, which is not the case with emulsion E.

Emulsion D, which is finer than emulsion E, is in much more intimate contact with the paper and undergoes a practically perfect catalytic action, which manifests itself in an extremely low adhesion and practically zero migration of the silicone material onto the adhesive.

We claim:

1. A process for reducing the foaming of a liquid susceptible to foaming which comprises incorporating in the liquid, as an anti-foaming agent, an emulsion consisting essentially of water and a silicone phase and 2 to 50 parts by weight sucro-glyceride per 100 parts by weight silicone.

2. The process of claim 1 wherein the emulsion contains 10 to 25 parts by weight sucro-glyceride per 100 parts by weight silicone.

3. The process of claim 1 wherein the silicone is a dimethylpolysiloxane oil of viscosity 1,000cSt. at 25°C containing pyrogenic silica or a mixture of a dimethylpolysiloxane of viscosity 2,000cSt. at 25°C, a methylhydrogenopolysiloxane and a dimethylpolysiloxane of viscosity 30 cPo. at 25°C and the sucroglyceride is a transesterification product of sucrose and suet.

* * * * *